(12) United States Patent
Wang et al.

(10) Patent No.: US 8,098,749 B2
(45) Date of Patent: Jan. 17, 2012

(54) CFR ESTIMATION METHOD FOR MULTI-BAND OFDM-BASED UWB SYSTEMS

(75) Inventors: Zhongjun Wang, Singapore (SG); Masayuki Tomisawa, Singapore (SG)

(73) Assignee: WIPRO Techno Centre (Singapore) Pte Ltd, Singapore (SG)

( * ) Notice: Subject to any disclaimer, the term of this patent is extended or adjusted under 35 U.S.C. 154(b) by 902 days.

(21) Appl. No.: 12/109,100

(22) Filed: Apr. 24, 2008

(65) Prior Publication Data
US 2009/0268782 A1    Oct. 29, 2009

(51) Int. Cl.
H04K 1/10 (2006.01)
H04L 27/28 (2006.01)

(52) U.S. Cl. .................. 375/260; 375/130; 375/316

(58) Field of Classification Search .............. 375/130, 375/260, 316; 370/203, 210
See application file for complete search history.

(56) References Cited

U.S. PATENT DOCUMENTS

| | | | |
|---|---|---|---|
| 2005/0069047 A1* | 3/2005 | Suzuki | 375/260 |
| 2005/0157801 A1* | 7/2005 | Gore et al. | 375/260 |
| 2006/0039488 A1* | 2/2006 | Wu et al. | 375/260 |
| 2007/0116141 A1* | 5/2007 | Li et al. | 375/260 |

* cited by examiner

*Primary Examiner* — Betsy Deppe
(74) *Attorney, Agent, or Firm* — Rabin & Berdo, P.C.

(57) ABSTRACT

A multi-stage CFR estimation method for multi-band OFDM-based UWB systems is provided. The method includes obtaining a CFR estimation $\hat{h}_r^{(1)}$ by performing LS estimation using a channel estimation sequence from a received OFDM-UWB frame; obtaining a CFR estimation $\hat{h}_r^{(2)}$ by applying a frequency-domain smoothing to the CFR estimation $\hat{h}_r^{(1)}$ with a first smoothing factor; obtaining a frame header which contains OFDM symbols transmitted with frequency-domain spreading on each OFDM symbol, and detecting signal signs based on a combination of two spread signals of the same OFDM symbol in the frame header with a decision directed mode and the CFR estimation $\hat{h}_r^{(2)}$ assisted; obtaining a CFR estimation $\hat{h}_r^{(3)}$ by using the signs and a finite-alphabet feature of the detected transmitted signals; obtaining a CFR estimation $\hat{h}_r^{(4)}$ by applying a frequency-domain smoothing to the CFR estimation $\hat{h}_r^{(3)}$ with a second smoothing factor; and obtaining a CFR estimation $\hat{h}_r$ by averaging the CFR estimations $\hat{h}_r^{(2)}$ and $\hat{h}_r^{(4)}$.

11 Claims, 4 Drawing Sheets

CFR ESTIMATION METHOD FOR MULTI-BAND OFDM-BASED UWB SYSTEMS

BACKGROUND OF THE INVENTION

1. Field of the Invention

The present invention relates to a method for estimating channel frequency response (CFR) for orthogonal frequency division multiplexing (OFDM) communications, and more particularly to a CFR estimation method for multi-band OFDM-based ultra-wideband (UWB) systems.

2. Description of Related Art

OFDM-based UWB communication has attracted a lot of attention in recent years, as described in the following references: [1] "A. Batra, J. Balakrishnan, G. R. Aiello, J. R. Foerster, and A. Dabak, "Design of a multiband OFDM system for realistic UWB channel environments," IEEE Trans. Microwave Theory and Techniques, vol. 52, no. 9, pp. 2123-2138, September 2004."; [2] "WiMedia MBOA, MultiBand OFDM Physical Layer Specification, ver. 1.1.5, Jul. 14, 2006."; [3] "Y. Li, A. F. Molisch, and J. Zhang "Practical approaches to channel estimation and interference suppression for OFDM-Based UWB communications," IEEE Trans. Wireless Commun., vol. 5, no. 9, pp. 2317-2320, September 2006.". The large bandwidth occupancy of UWB (from 3.1 GHz to 10.6 GHz) and the high efficiency in spectrum utilization provided by OFDM make it possible for the OFDM-UWB technology to achieve very high channel capacity. The OFDM-UWB can provide low-cost and high-speed wireless connectivity among devices within a short range. The wireless universal serial bus (USB), for example, has adopted the OFDM-UWB radio layer with the data rate up to 480 Mbps.

The extremely wide-band processing has brought a lot of challenges to the OFDM-UWB system design, especially to the design of some crucial receiving modules such as time synchronization, frequency synchronization, as well as the channel frequency response (CFR) estimation. The OFDM-based UWB system, as specified by the Wimedia Alliance (shown in [2]), uses frame-based transmission. Usually, the UWB channel can be treated as invariant over the transmission period of one OFDM frame. The estimation of CFR thus can be done based on the dedicated channel estimation sequence included in the frame preamble. In this sense, many existing schemes including the least-square (LS), the maximum-likelihood (ML) and the minimum mean-squared error (MMSE) algorithms can be adopted for CFR estimation, as described in the following references: [4] "B. Muquet, M. de Courville, and P. Duhamel, "Subspace-based blind and semi-blind channel estimation for OFDM systems," IEEE Trans. Signal Proc., vol. 50, no. 7, pp. 1699-1712, July 2002."; [5] "S. Zhou and G. B. Giannakis, "Finite-Alphabet based channel estimation for OFDM and related multicarrier systems," IEEE Trans. Commun., vol. 49, no. 8, pp. 1402-1414, August 2001."; [6] "M. Morelli and U. Mengali, "A comparison of pilot-aided channel estimation methods for OFDM systems," IEEE Trans. Signal Processing, vol. 49, no. 12, pp. 3065-3073, December 2001."; [7] "O. Edfors, M. Sandell, J. van de Beek, S. K. Wilson, and P. O. Börjesson, "OFDM channel estimation by singular value decomposition," IEEE Trans. Commun., vol. 46, no. 7, pp. 931-939, July 1998."; [8] "L. Deneire, P. Vandenameele, L. V. d. Perre, B. Gyselinckx, and M. Engels, "A low complexity ML channel estimator for OFDM," IEEE Trans. Commun., vol. 51, no. 2, pp. 135-140, February 2003.". LS is the simplest, but has the drawback of low noise reduction capability. In particular, as the OFDM-UWB is supposed to deliver good service even under very low signal-noise ratio (SNR) condition ($\leq 0$ dB, see [1]), simply applying the LS algorithm to the channel estimation sequence may not yield the CFR estimation with acceptable accuracy. Both ML and MMSE offer high estimation accuracy, but suffer from high computational complexity. The ML estimation introduced in [8], for example, either requires pre-storing a large matrix in memory or performing matrix inversion in real time. This, of course, is prohibitive for actual implementation of low-power and low-cost wireless USB devices.

SUMMARY OF THE INVENTION

An object of the present invention is to provide a CFR estimation method for the multi-band OFDM-based UWB system, which is the LS based, but can achieve the estimation accuracy comparable to that of the ML based solution while maintaining the order of computational complexity similar to that of the conventional LS based solution.

According to the above-mentioned object, a CFR estimation method for multi-band OFDM-based UWB systems is provided. The CFR estimation method comprises: obtaining a CFR estimation $\hat{h}_r^{(1)}$ by performing least square estimation using a channel estimation sequence from a received OFDM-UWB frame; obtaining a CFR estimation $\hat{h}_r^{(2)}$ by applying a frequency-domain smoothing to the CFR estimation $\hat{h}_r^{(1)}$ with a first smoothing factor; obtaining from the received OFDM-UWB frame a frame header which contains OFDM symbols transmitted with frequency-domain spreading on each OFDM symbol, each OFDM symbol being divided into N transmitted signals for modulating the corresponding sub-carriers; and then detecting signs of the transmitted signals based on a combination of two frequency-domain spread transmitted signals of the same OFDM symbol with a decision directed mode and the CFR estimation $\hat{h}_r^{(2)}$ assisted; obtaining a CFR estimation $\hat{h}_r^{(3)}$ by using the signs and a finite-alphabet feature of the detected transmitted signals; obtaining a CFR estimation $\hat{h}_r^{(4)}$ by applying a frequency-domain smoothing to the CFR estimation $\hat{h}_r^{(3)}$ with a second smoothing factor; and finally, obtaining a CFR estimation $\hat{h}_r$ by averaging the CFR estimations $\hat{h}_r^{(2)}$ and $\hat{h}_r^{(4)}$.

DETAILED DESCRIPTION OF THE INVENTION

The preferred embodiment of the present invention will be described in detail by way of example and with reference to the above-mentioned figures.

Figure 1:
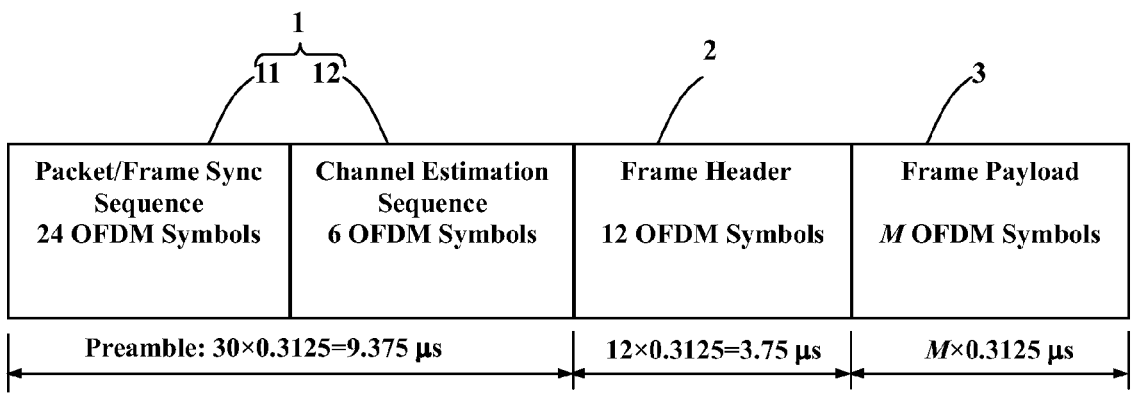
FIG. 1 is a diagram illustrating an OFDM-UWB frame structure.

As shown in FIG. 1, each OFDM-UWB frame is composed of a preamble 1, a frame header 2 and a frame payload 3. As specified in [2], the preamble 1 consists of 30 OFDM symbols. The first 24 symbols of the preamble are referred to as packet/frame sync sequence 11 and the last 6 symbols of the preamble are referred to as channel estimation sequence 12 which is dedicated to channel estimation. The frame header 2 consists of 12 OFDM symbols which convey information about the configuration of the current frame. The frame payload 3 consists of M OFDM data symbols where M is a multiple of 6, i.e, M=6P. The duration of each OFDM symbol is 0.3125 μs. Thus, the durations of the preamble, frame header and frame payload are respectively 9.375 μs, 3.75 μs and M×0.3125 μs. Denote by $Z_{P_1}^{P_2}$ the finite integer set $\{P_1, P_1+1, \ldots, P_2\}$. For discussion convenience, in the sequel, the OFDM symbol is indexed with n, $n \in Z_0^{M+17}$, and n=0 indicates the first channel estimation OFDM symbol. The OFDM symbols are divided into groups, each of which consists of 6 consecutive OFDM symbols and is indexed with m, $m \in Z_0^{P+2}$, and m=0 indicates the group of 6 OFDM symbols for channel estimation.

Figure 2:
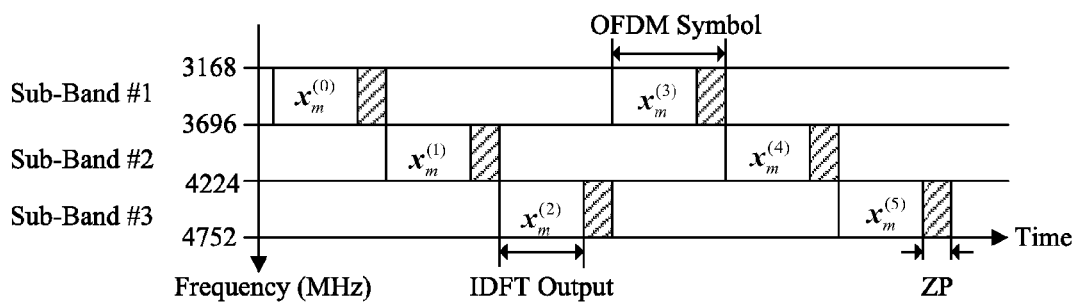
FIG. 2 is a diagram showing one realization of time-frequency code (TFC=1) for the mth multiband OFDM symbol group.

The 6 OFDM symbols in a group may be transmitted in multiple bands. The center frequency for the transmission of each OFDM symbol is prescribed by a time-frequency code (TFC). FIG. 2 shows one realization of TFC (TFC=1), where the first OFDM symbol of the mth group is transmitted on sub-band #1 (3168-3696 MHz); the second OFDM symbol is transmitted on sub-band #2 (3696-4224 MHz); the third OFDM symbol is transmitted on sub-band #3 (4224-4752 MHz); the fourth OFDM symbol is transmitted on sub-band #1 and so on. Without loss of generality, TFC=1 is used in the following.

Each OFDM symbol employs N=128 subcarriers, which include Q=112 actual tones (carry useful information), $Q_1$=10 guard tones, and $Q_2$=6 virtual (null) tones. Of the Q actual tones, R=12 are assigned as pilot tones. We consider the generation of the nth OFDM symbol (n=6m+i, $i \in Z_0^5$, $m \in Z_0^{P+2}$), and let $$s_m^{(i)} = [s_m^{(i)}(0), s_m^{(i)}(1), \ldots, s_m^{(i)}(N-1)]^T \quad (1)$$

be a vector of N transmitted signals, where $(.)^T$ denotes transpose and $s_m^{(i)}(k)$, $k \in Z_0^{N-1}$, is the transmitted signal modulating the kth subcarrier. Define an R×1 vector, $p=[p(0), p(1), \ldots, p(R-1)]^T = [5, 15, 25, 35, 45, 55, 73, 83, 93, 103, 113, 123]^T$. Let $Q_0=(Q+Q_1)/2$, $s_m^{(i)}(k)$ is drawn from the quadrature phase-shift keying (QPSK) constellation—denoted as $\pm c \pm jc$ with $j=\sqrt{-1}$ and $c=\sqrt{2}/2$, if $k \in Z^{Q_0} \cup Z_{N-Q_0}^{N-1}$, and, in particular, $s_m^{(i)}(k)$ is known at the receiver end (for the pilot tones) if $k \in \{p(l)\}_{l=0}^{R-1}$. Also, $s_m^{(i)}(k)=0$, if (k=0) $\cup$ $k \in Z_{Q_0 1}^{N-Q_0-1}$. The signal vector, $s_m^{(i)}$, is fed to an N-point inverse discrete Fourier transform (IDFT) processor that yields an N×1 time-domain vector (IDFT output), denoted by $x_m^{(i)}$ (see $x_m^0$, $x_m^{(1)}$, $x_m^{(2)}$, $x_m^{(3)}$, $x_m^{(4)}$, and, $x_m^{(5)}$ in FIG. 2). To eliminate the intersymbol interference (ISI) resulting from the time dispersive channels, an $N_g$-point zero-padded (ZP) suffix is appended to each time-domain vector $x_m^{(i)}$, thus forming an OFDM symbol as shown in FIG. 2.

The UWB channel is modeled as an $N_h$-tap finite impulse response filter whose impulse response on the rth sub-band is denoted as $$h_r^{(t)} = [h_r^{(t)}(0), h_r^{(t)}(1), \ldots, h_r^{(t)}(N_h-1)]^T, r \in Z_1^3 \quad (2)$$

where the superscript $^{(t)}$ indicates time-domain. The corresponding channel frequency response (CFR) $h_r=[h_r(0), h_r(1), \ldots, h_r(N-1)]^T$ is given by $h_r=F_{N_h}h_r^{(t)}$, where $F_N$, is the first $N_h$ columns of the N-point DFT matrix.

For the sake of simplicity and without loss of validity, we assume perfect time and frequency synchronization in the following discussion. At the receiver end, the received samples pass through an N-point DFT processor after $N_g$ zero padded points of each OFDM symbol are removed by using an overlap-and-add method. With the assumption that $N_h \leq N_g$, the output of the DFT processor corresponding to the nth received OFDM symbol, $y_m^{(i)}=[y_m^{(i)}(0), y_m^{(i)}(1), \ldots, y_m^{(i)}(N-1)]^T$, is given by $$y_m^{(i)}(k) = s_m^{(i)}(k) h_r(k) + v_r(k) \quad (3)$$

$r=|i|_3+1$, $i \in Z_0^5$, and $k \in Z_0^{N-1}$, where $|.|_3$ stands for the modulo-3 operation, and $v_r(k)$ is the channel noise on the ith sub-band, which is modeled in frequency-domain as a zero mean Gaussian process with variance $\sigma_r^2$.

Moreover, it should be noted that, within each OFDM symbol contained in the frame header, a frequency-domain spreading is performed. That is, $$s_m^{(i)}(k) = (s_m^{(i)}(N-k))^* \; k \in Z_1^{Q/2}, \; i \in Z_0^5, \; m \in Z_1^2 \quad (4)$$

where $(\bullet)^*$ denotes conjugation. The frequency-domain spreading maximizes frequency-diversity by transmitting the same information (a complex number and its complex conjugate) on two separate subcarriers within the same OFDM symbol. The property has been used in the development of the channel estimation scheme of this invention as we shall see in the following description.

Figure 3:
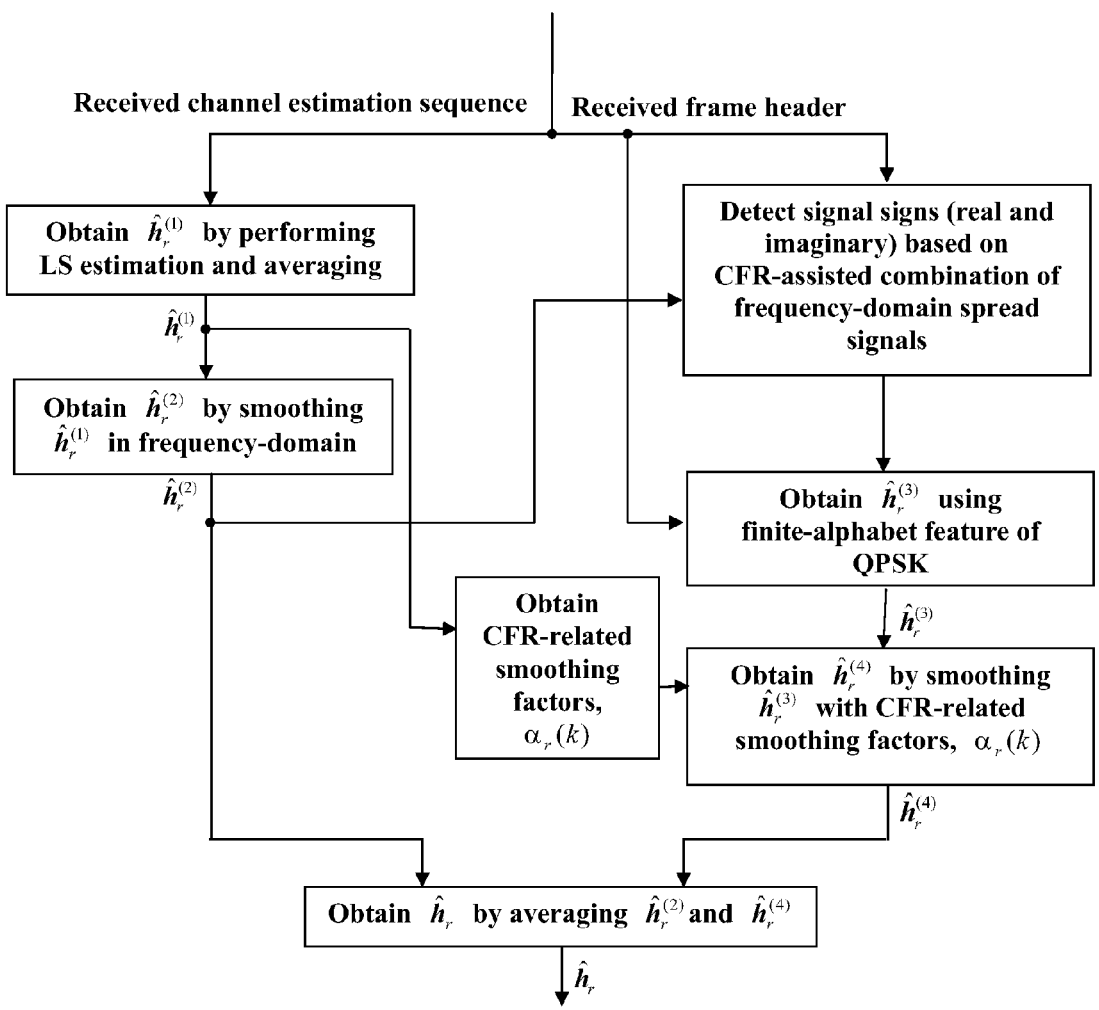
FIG. 3 is a flow chart describing a method for estimating the channel frequency response for an OFDM-UWB system of one embodiment of the present invention.

Referring to FIG. 3, one embodiment of the present invention consists of five steps. Let $\hat{h}_r^{(q)}=[\hat{h}_r^{(q)}(0), \hat{h}_r^{(q)}(1), \ldots, \hat{h}_r^{(q)}(N-1)]^T$, $r \in Z_1^3$, be the estimate of $h_r$ after the qth step. In the first step, we obtain $\hat{h}_r^{(1)}$ from (3) as $$\hat{h}_r^{(1)}(k) = [y_0^{(r-1)}(k)/s_0^{(r-1)}(k) + y_0^{(r+2)}(k)/s_0^{(r+2)}(k)]/2 \quad (5)$$

$k \in Z^{Q/2} \cup Z_{N-Q/2}^{N-1}$. Clearly, this is the LS estimation using the dedicated channel estimation sequence (m=0), which is improved (with 3 dB gain in estimation accuracy) by averaging the two results obtained from the same sub-band.

In the second step, based on the assumption that the channel coherent bandwidth is much larger than the subcarrier spacing (which is valid under the UWB channel conditions), we apply a simple frequency-domain smoothing to such that $\hat{h}_r^{(2)}$ with a first smoothing factor α is obtained as:

$$\hat{h}_r^{(2)}(k) = \alpha[\hat{h}_r^{(1)}(k-1) + \hat{h}_r^{(1)}(k+1)] + (1-2\alpha)\hat{h}_r^{(1)}(k) \quad (6)$$

$k \in Z_1^{Q/2} \cup Z_{N-Q/2}^{N-1}$, where 0<α<0.5. In this way, the CFR on each subcarrier has been smoothed using the estimations on its adjacent subcarriers such that the residual error contained in the initial LS estimate can be reduced.

Next, in the third step, we introduce an efficient decision-directed (DD) detection based semi-blind CFR estimation by exploiting the frequency-domain spreading property of the frame header and the finite-alphabet feature of QPSK modulation. Denote by $\hat{s}_m^{(i)}(k)$, $k \in Z_1^{Q/2} \cup Z_{N-Q/2}^{N-1}$ and $k \notin \{p(l)\}_{l=0}^{R-1}$, the detected transmitted signals of an OFDM symbol (after equalization using $\hat{h}_r^{(2)}$), are obtained as $$\hat{s}_m^{(i)}(k) = y_m^{(i)}(k)/\hat{h}_r^{(2)}(k), r=|i|_3+1, i \in Z_0^5, m \in Z_1^2. \quad (7)$$

Correspondingly, let $$u_m^{(i)} = [u_m^{(i)}(0), u_m^{(i)}(1), \ldots, u_m^{(i)}(N-1)]^T$$

and $$v_m^{(i)} = [v_m^{(i)}(0), v_m^{(i)}(1), \ldots, v_m^{(i)}(N-1)]^T$$

which are calculated by $$u_m^{(i)}(k) = \begin{cases} \text{sgn}[\Re(\lambda_m^{(i)}(k) + \lambda_m^{(i)}(N-k))], & k \in \mathbb{Z}_1^{Q/2} \text{ and } k \notin \{p(l)\}_{l=0}^{R-1} \\ u_m^{(i)}(N-k), & k \in \mathbb{Z}_{N-Q/2}^{N-1} \text{ and } k \notin \{p(l)\}_{l=0}^{R-1} \end{cases} \quad (8)$$

and $$v_m^{(i)}(k) = \begin{cases} \text{sgn}[\Im(\lambda_m^{(i)}(k) - \lambda_m^{(i)}(N-k))], & k \in \mathbb{Z}_1^{Q/2} \text{ and } k \notin \{p(l)\}_{l=0}^{R-1} \\ -v_m^{(i)}(N-k), & k \in \mathbb{Z}_{N-Q/2}^{N-1} \text{ and } k \notin \{p(l)\}_{l=0}^{R-1} \end{cases} \quad (9)$$

where $\Re(x)$ and $\Im(x)$ denote the real and imaginary parts of x, respectively, sgn(x) equals to 1, if $x \geq 0$, and, $-1$, otherwise, and $$\lambda_m^{(i)}(k) = |\hat{h}_r^{(2)}(k)|^2 \hat{s}_m^{(i)}(k) = y_m^{(i)}(k)[\hat{h}_r^{(2)}(k)]^* \quad (10)$$

$k \in \mathbb{Z}_1^{Q/2} \cup \mathbb{Z}_{v-Q/2}^{N-1}$ and $k \notin \{p(l)\}_{l=0}^{R-1}$, $i \in \mathbb{Z}_o^5$, and $m \in \mathbb{Z}_1^2$. It should be noted that multiplying $\hat{s}_m^{(i)}(k)$ by $|\hat{h}_r^{(2)}(k)|^2$ in (10) yields a weighted combining of the two frequency-domain spread signals in (8) and (9), i.e., $\lambda_m^{(i)}(k) + \lambda_m^{(i)}(N-k)$ and $\lambda_m^{(i)}(k) - \lambda_m^{(i)}(N-k)$, in a way similar to the maximum ratio combining (MRC) (see, for example, [3]), but with lower complexity as no division is required as can be seem from (10). Furthermore, the use of signals' signs instead of their actual values in (8) and (9) makes the proposed CFR-aided DD coherent detection in this invention noise-resistant and thus reliable. Therefore, by using the finite-alphabet feature ($\{(+c,-c),(+c,+c),(-c,-c),(-c,+c)\}$) of QPSK modulation, and note that $|s_m^{(i)}(k)|^2 = 2c^2 = 1$, the CFR estimation, $\hat{h}_r^{(3)}$, in this step can be obtained as $$\hat{h}_r^{(3)}(k) = \frac{c}{4} \sum_{m=1}^{2} \sum_{l=r-1,r+2} (y_m^{(l)}(k)[u_m^{(l)}(k) - jv_m^{(l)}(k)]) k \in \mathbb{Z}_1^{Q/2} \cup \mathbb{Z}_{N-Q/2}^{N-1} \quad (11)$$

and $k \notin \{p(l)\}_{l=0}^{R-1}$.

Taking the pilot tones into account, (11) can be further expressed as $$\hat{h}_r^{(3)}(k) = \begin{cases} \frac{c}{4} \sum_{m=1}^{2} \sum_{\substack{q=r-1 \\ q=r+2}}^{2} (y_m^{(q)}(k)[u_m^{(q)}(k) - jv_m^{(q)}(k)]), & k \in \mathbb{Z}_1^{Q/2} \cup \mathbb{Z}_{N-Q/2}^{N-1} \\ & \text{and } k \notin \{p(l)\}_{l=0}^{R-1} \\ \frac{1}{4} \sum_{m=1}^{2} \sum_{\substack{q=r-1 \\ q=r+2}}^{2} (y_m^{(q)}(k)[s_m^{(q)}(k)]^*), & k \in \{p(l)\}_{l=0}^{R-1} \end{cases} \quad (12)$$

$r \in \mathbb{Z}_1^3$.

In the fourth step of the channel estimation, we apply a frequency-domain smoothing to $\hat{h}_r^{(3)}$ obtained in the third step. The resulting CFR estimation, $\hat{h}_r^{(4)}$, is given by $$\hat{h}_r^4(k) = \alpha_r(k-1)\hat{h}_r^{(3)}(k-1) + \alpha_r(k+1)\hat{h}_r^{(3)}(k+1) + \\ (1 - \alpha_r(k-1) - \alpha_r(k+1))\hat{h}_r^{(3)}(k) k \in \mathbb{Z}_1^{Q/2} \cup \mathbb{Z}_{N-Q/2}^{N-1}, \quad (13)$$

where $$\alpha_r(k) = \min\left(\alpha, \frac{Q|\hat{h}_r^{(1)}(k)|^2}{\sum_{l \in \mathbb{Z}_1^{Q/2} \cup \mathbb{Z}_{N-Q/2}^{N-1}} |\hat{h}_r^{(1)}(l)|^2}\right). \quad (14)$$

The use of CFR-related smoothing factors, $\alpha_r(k)$'s, can further enhance the robustness of the proposed DD detection against different channel conditions. Finally, in the fifth step, we obtain $\hat{h}_r = [\hat{h}_r(0), \hat{h}_r(1), \ldots, \hat{h}_r(N-1)]^T$ by combining $\hat{h}_r^{(2)}$ and $\hat{h}_r^{(4)}$ via averaging, i.e., $$\hat{h}_r = \hat{h}_r^{(5)} = (2\hat{h}_r^{(2)} + 4\hat{h}_r^{(4)})/6, r \in \mathbb{Z}_1^3. \quad (15)$$

The multi-stage CFR estimation method of the present invention is still LS based, but enhanced with the frequency-domain smoothing as well as a unique and simple decision-directed coherent detection process. The present invention outperforms the existing solutions in the sense that it achieves the estimation accuracy comparable to that of the complicated ML solution while maintaining low computational complexity similar to the LS solution.

The channel estimation performance can be evaluated in terms of normalized mean-squared error (NMSE) defined by $$NMSE = \frac{\sum_{r=1}^{3} E\left[\sum_{k \in \mathbb{Z}_1^{Q/2} \cup \mathbb{Z}_{N-Q/2}^{N-1}} |h_r(k) - \hat{h}_r(k)|^2\right]}{\sum_{r=1}^{3} E\left[\sum_{k \in \mathbb{Z}_1^{Q/2} \cup \mathbb{Z}_{N-Q/2}^{N-1}} |h_r(k)|^2\right]}$$

where E[.] denotes the statistical average operation over the Monte Carlo tests. By averaging, the four extra estimations (per sub-band) obtained using the frame header shall introduce about $10 \log_{10}(6/2) = 4.77$ dB gain over the initial estimation using two dedicated channel estimation symbols (per sub-band). The frequency-domain smoothing further contributes about 2~2.5 dB gain. Therefore, the present invention can achieve about 7 dB gain over the conventional LS solution in total, which even outperforms the complicated ML solution using two dedicated channel estimation symbols (per sub-band). This will be further demonstrated in the following numerical examples.

The effectiveness of the proposed CFR estimation method of this invention is verified by numerical simulations. In the simulations, the OFDM-UWB system with the data rate of 80 Mbps is considered. The selection of a low data rate as example here is for demonstrating the effectiveness of the proposed techniques under low SNR conditions. The UWB channel model CM1, which is a line of sight (LOS) S-V multipath channel as described in [1], has been used. Also, TFC=1, $\alpha=0.3$, and the frame payload is 1024 bytes long.

Figure 4:
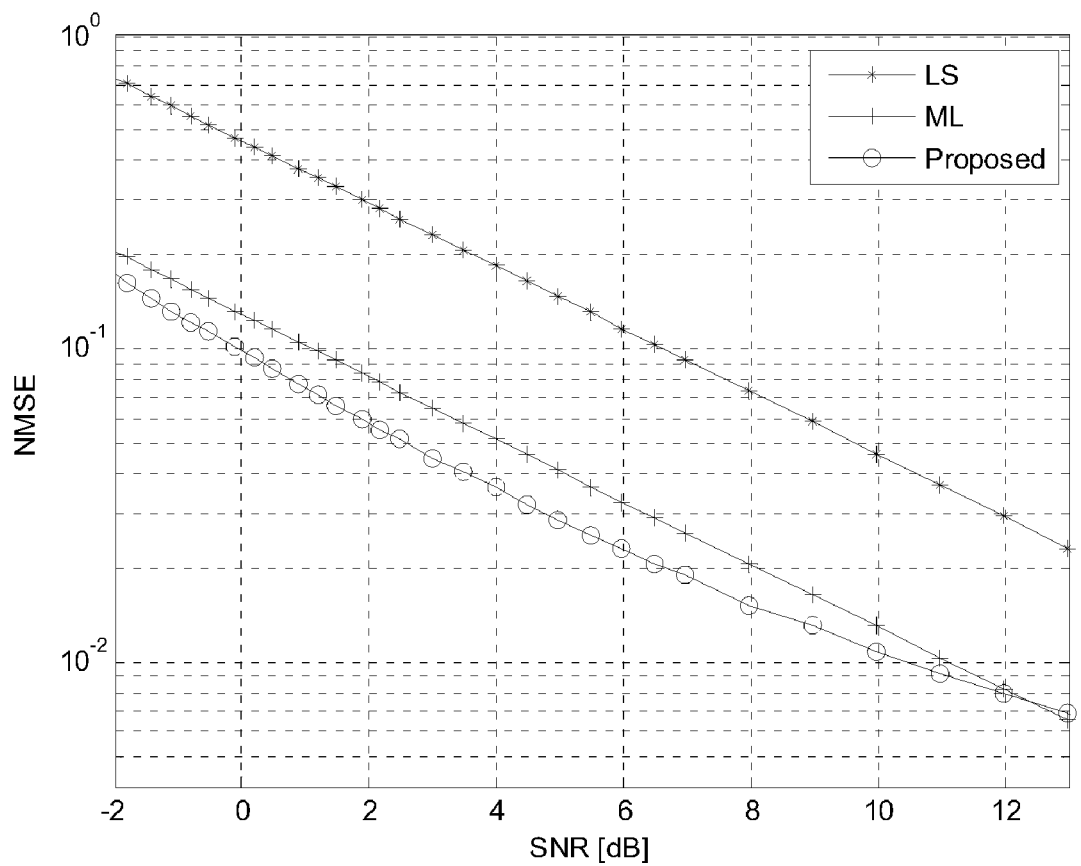
FIG. 4 is a plot showing the NMSE performance of the channel frequency response (CFR) estimation using the method of the present invention in comparison to the conventional LS and ML based methods.
Figure 5:
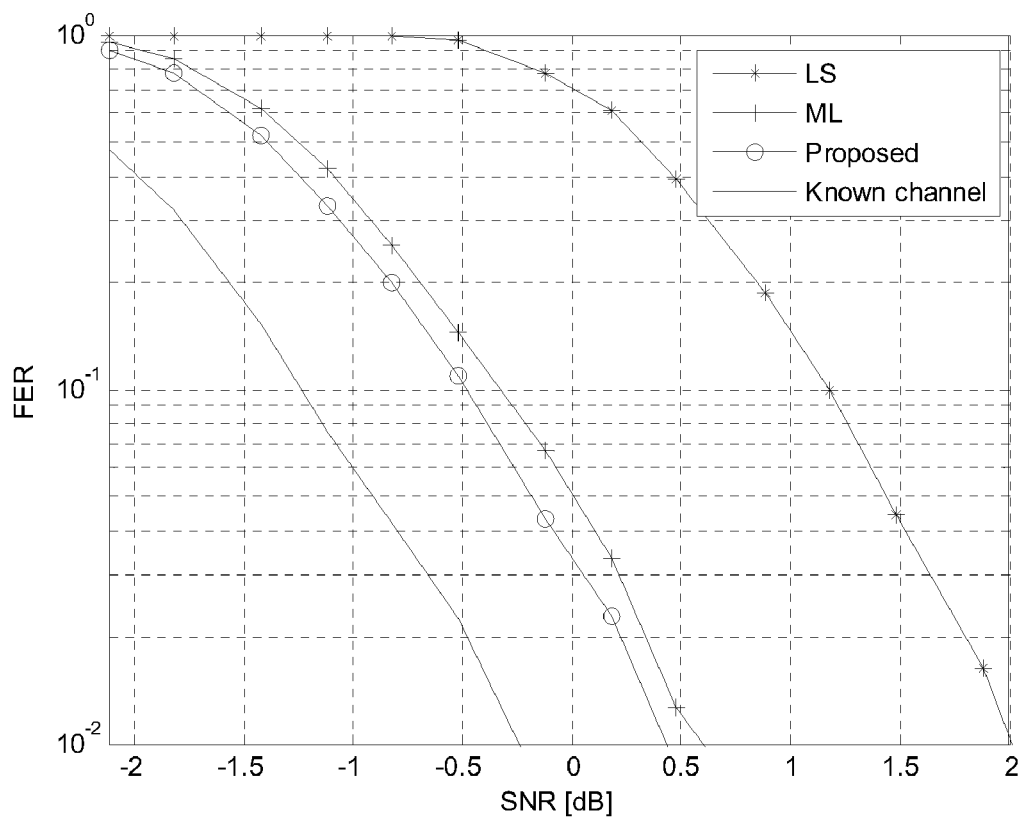
FIG. 5 is a plot showing the FER performance of the CFR estimation using the method of this invention in comparison to the conventional LS and ML based methods as well as a method with the assumption that the CFR is known.

FIG. 4 shows the NMSE performance versus the SNR for different channel estimation schemes. As expected, the proposed channel estimation (the present invention) performs much better than the conventional LS technique with about 7 dB gain. For comparison, FIG. 4 also shows the performance of the ML solution which has achieved about 6 dB gain over the LS technique. In this case, we have set $N_h = N/4 = 32$ which is less than $N_g=37$. Thus, theoretically, 6 dB gain is close to the maximum gain that the ML estimation can achieve. Observe from FIG. 4 that our proposed scheme is better than the ML estimation when SNR is low, and both perform similarly when SNR increases to a higher level. The frame error rate (FER) performance is shown in FIG. 5. It can be seen that the proposed scheme performs much better than the LS method (about 1.7 dB). It slightly outperforms the ML estimation and performs comparable to that with perfect channel knowledge.

Various modifications to the embodiment of the present invention described above may be made. For example, other steps can be added or used as substitute for those above. Thus, although the invention has been described above using particular embodiments, many variations are possible within the scope of the claims, as will be clear to the skilled in the art, without departing from the scope of the invention.

We claim:

1. A channel frequency response (CFR) estimation method for a multi-band orthogonal frequency division multiplexing (OFDM)-based ultra-wideband (UWB) system to achieve a CFR estimation, $\hat{h}_r = [\hat{h}_r(0), \hat{h}_r(1), \ldots, \hat{h}_r(N-1)]^T$, on an rth sub-band, N indicating the number of subcarriers employed by one OFDM symbol, the superscript T denoting transpose, comprising:
   receiving an OFDM-UWB frame in an OFDM-UWB receiver of the multi-band OFDM-based UWB system;
   obtaining, by the OFDM-UWB receiver, a first CFR estimation $\hat{h}_r^{(1)} = [\hat{h}_r^{(1)}(0), \hat{h}_r^{(1)}(1), \ldots, \hat{h}_r^{(1)}(N-1)]^T$ by performing least square estimation using a channel estimation sequence in the received OFDM-UWB frame;
   obtaining a second CFR estimation $\hat{h}_r^{(2)} = [\hat{h}_r^{(2)}(0), \hat{h}_r^{(2)}(1), \ldots, \hat{h}_r^{(2)}(N-1)]^T$ by applying frequency-domain smoothing to the first CFR estimation $\hat{h}_r^{(1)}$ using a first smoothing factor;
   obtaining, from the received OFDM-UWB frame, a frame header containing a plurality of OFDM symbols, each OFDM symbol being transmitted with frequency-domain spreading, and being divided into N transmitted signals for modulating corresponding subcarriers;
   for each OFDM symbol, detecting signs of the N transmitted signals using two frequency-domain spread signals corresponding to each of the N transmitted signals and the second CFR estimation $\hat{h}_r^{(2)}$;
   obtaining a third CFR estimation $\hat{h}_r^{(3)} = [\hat{h}_r^{(3)}(0), \hat{h}_r^{(3)}(1), \ldots, \hat{h}_r^{(3)}(N-1)]^T$ using the detected signs and a finite-alphabet feature of the N transmitted signals for each OFDM symbol;
   obtaining a fourth CFR estimation $\hat{h}_r^{(4)} = [\hat{h}_r^{(4)}(0), \hat{h}_r^{(4)}(1), \ldots, \hat{h}_r^{(4)}(N-1)]^T$ by applying frequency-domain smoothing to the third CFR estimation $\hat{h}_r^{(3)}$ with a second smoothing factor; and
   obtaining the CFR estimation $\hat{h}_r$ by averaging the second and fourth CFR estimations $\hat{h}_r^{(2)}$ and $\hat{h}_r^{(4)}$.

2. The CFR estimation method according to claim 1, wherein the step of obtaining the first CFR estimation $\hat{h}_r^{(1)}$, the first CFR estimation $\hat{h}_r^{(1)}$ is determined by averaging two LS estimation results obtained from an identical sub-band.

3. The CFR estimation method according to claim 1, wherein in the step of obtaining the second CFR estimation $\hat{h}_r^{(2)}$, the first CFR estimation $\hat{h}_r^{(1)}$ on each of the subcarriers is smoothed using the first CFR estimations on its adjacent subcarriers.

4. The CFR estimation method according to claim 3, wherein the second CFR estimation $\hat{h}_r^{(2)}$ on one of the subcarriers k, $\hat{h}_r^{(2)}(k)$, is given by $$\hat{h}_r^{(2)}(k) = \alpha[\hat{h}_r^{(1)}(k-1) + \hat{h}_r^{(1)}(k+1)] + (1-2\alpha)\hat{h}_r^{(1)}(k),$$
$$k \in Z_1^{Q/2} \cup Z_{N-Q/2}^{N-1},$$

where
   $\alpha$ is the first smoothing factor satisfying the condition $0 < \alpha < 0.5$;
   Q is the number of the subcarriers for actual tones;
   $Z_{P_1}^{P_2}$ denotes the finite integer set $\{P_1, P_1+1, \ldots, P_2\}$, and
   $\hat{h}_r^{(1)}(k-1), \hat{h}_r^{(1)}(k)$, and, $\hat{h}_r^{(1)}(k+1)$ respectively indicate the first CFR estimations $\hat{h}_r^{(1)}$ on the subcarriers k−1, k, and, k+1.

5. The CFR estimation method according to claim 1, wherein in the step of obtaining the frame header, the frequency-domain spreading on each OFDM symbol is implemented by transmitting each signal of the OFDM symbol and its conjugated signal on two separate subcarriers.

6. The CFR estimation method according to claim 1, wherein the step of detecting the signs of the N transmitted signals further includes:
   dividing an output of one of the subcarriers, subcarrier k, of a discrete Fourier transform (DFT) processor, $y_m^{(i)}(k)$, by the second CFR estimations $\hat{h}_r^{(2)}$ on the subcarrier k, $\hat{h}_r^{(2)}(k)$, determine a transmitted signal on the subcarrier k, $\hat{s}_m^{(i)}(k)$;
   dividing an output of the subcarriers, subcarrier N−k, of the DFT processor, $y_m^{(i)}(N-k)$, by the second CFR estimations $\hat{h}_r^{(2)}$ on the subcarrier N−k, $\hat{h}_r^{(2)}(N-k)$, to determine a transmitted signal on the subcarrier N−k, $\hat{s}_m^{(i)}(N-k)$;
   multiplying the transmitted signal on the subcarrier k, $\hat{s}_m^{(i)}(k)$, by the squared magnitude of the second CFR estimations $\hat{h}_r^{(2)}$ on the subcarrier k, $\hat{h}_r^{(2)}(k)$, to yield a weighted frequency-domain spread signal for subcarrier k, $\lambda_m^{(i)}(k) = y_m^{(i)}(k)[\hat{h}_r^{(2)}(k)]^*$;
   multiplying the transmitted signal on the subcarrier N−k, $\hat{s}_m^{(i)}(N-k)$, by the squared magnitude of the second CFR estimations $\hat{h}_r^{(2)}$ on the subcarrier N−k, $\hat{h}_r^{(2)}(N-k)$, to yield a weighted frequency-domain spread signal for subcarrier N−k, $\lambda_m^{(i)}(N-k) = y_m^{(i)}(N-k)[\hat{h}_r^2(N-k)]^*$; and
   combining the two weighted frequency-domain spread signals, $\lambda_m^{(i)}(k)$ and $\lambda_m^{(i)}(N-k)$, to yield a pair of combinations of the two frequency-domain spread signals, $\lambda_m^{(i)}(k) + \lambda_m^{(i)}(N-k)$ and $\lambda_m^{(i)}(k) - \lambda_m^{(i)}(N-k)$; wherein
   [.]* denotes conjugation;
   the received OFDM-UWB frame includes a plurality of OFDM symbol groups, indexed with m, each of which has a certain number of OFDM symbols, indexed with i; and
   the superscript (i) and the subscript m in $y_m^{(i)}(k)$, $\hat{s}_m^{(i)}(k)$ and $\lambda_m^{(i)}(k)$ indicate that the step of detecting is performed by using the ith OFDM symbol in the mth OFDM symbol group.

7. The CFR estimation method according to claim 6, wherein the sign of each transmitted signal include the signs of the real and imaginary parts of the transmitted signal, and using the pair of combinations of the two frequency-domain spread signals, $\lambda_m^{(i)}(k) + \lambda_m^{(i)}(N-k)$ and $\lambda_m^{(i)}(k) - \lambda_m^{(i)}(N-k)$, the signs of the real and imaginary parts of the transmitted signal on the subcarrier k are given by:

$$u_m^{(i)}(k) = \begin{cases} \text{sgn}[\mathcal{R} \ (\lambda_m^{(i)}(k) + \lambda_m^{(i)}(N-k))], & k \in \mathbb{Z}_1^{Q/2} \text{ and } k \notin \{p(l)\}_{l=0}^{R-1} \\ u_m^{(i)}(N-k), & k \in \mathbb{Z}_{N-Q/2}^{N-1} \text{ and } k \notin \{p(l)\}_{l=0}^{R-1} \end{cases}$$

and $$v_m^{(i)}(k) = \begin{cases} \text{sgn}[\mathfrak{I} \ (\lambda_m^{(i)}(k) - \lambda_m^{(i)}(N-k))], & k \in \mathbb{Z}_1^{Q/2} \text{ and } k \notin \{p(l)\}_{l=0}^{R-1} \\ -v_m^{(i)}(N-k), & k \in \mathbb{Z}_{N-Q/2}^{N-1} \text{ and } k \notin \{p(l)\}_{l=0}^{R-1} \end{cases}$$

where $Z_{P_1}^{P_2}$ denotes a finite integer set $\{P_1, P_1+1, \ldots, P_2\}$;

$\mathfrak{R}(x)$ and $\mathfrak{I}(x)$ denote the real and imaginary parts of x, respectively;

sgn(x) equals 1, if $x \geq 0$, and −1 otherwise;

Q is the number of the subcarriers for actual tones; and $\{p(l)\}_{l=0}^{R-1}$ index the R subcarriers assigned as pilot tones in each OFDM symbol.

8. The CFR estimation method according to claim 1, wherein in the step of obtaining the third CFR estimation $\hat{h}_r^{(3)}$, the third CFR estimation $\hat{h}_r^{(3)}$ on one of the subcarriers, subcarrier k, $\hat{h}_r^{(3)}(k)$, with the finite-alphabet feature being $\{(+c,-c),(+c,+c),(-c,-c),(-c,+c)\}$, is obtained as:

$$\hat{h}_r^{(3)}(k) = \begin{cases} \dfrac{c}{4} \sum_{m=1}^{2} \sum_{\substack{q=r-1 \\ q=r+2}} (y_m^{(q)}(k)[u_m^{(q)}(k) - jv_m^{(q)}(k)]), & k \in \mathbb{Z}_1^{Q/2} \cup \mathbb{Z}_{N-Q/2}^{N-1} \\ & \text{and } k \notin \{p(l)\}_{l=0}^{R-1} \\ \dfrac{1}{4} \sum_{m=1}^{2} \sum_{\substack{q=r-1 \\ q=r+2}} (y_m^{(q)}(k)[s_m^{(q)}(k)]^*), & k \in \{p(l)\}_{l=0}^{R-1} \end{cases}$$

where $y_m^{(q)}(k)$ is an output of the subcarrier k of a DFT processor;

$s_m^{(q)}(k)$ is an input of an inverse discrete Fourier transform (IDFT) processor;

[.]* denotes conjugation;

$u_m^{(q)}(k)$ and $v_m^{(q)}(k)$ respectively indicate the signs of the real and imaginary parts of a transmitted signal on the subcarrier k; $j=\sqrt{-1}$;

the received OFDM-UWB frame includes a plurality of OFDM symbol groups, indexed with m, each of which has a certain number of OFDM symbols, indexed with q; and the superscript (q) and the subscript m indicate that the step of obtaining the third CFR estimation $\hat{h}_r^{(3)}$ is performed by using the qth OFDM symbol in the mth OFDM symbol group;

$Z_{P_1}^{P_2}$ denotes the finite integer set $\{P_1, P_1+1, \ldots, P_2\}$; and Q is the number of the subcarriers for actual tones; and $\{p(l)\}_{l=0}^{R-1}$ index the R subcarriers assigned as pilot tones in each OFDM symbol.

9. The CFR estimation method according to claim 1, wherein the second smoothing factor on one of the subcarriers, subcarrier k, is obtained as:

$$\alpha_r(k) = \min\left(\alpha, \frac{Q|\hat{h}_r^{(1)}(k)|^2}{\sum_{l \in \mathbb{Z}_1^{Q/2} \cup \mathbb{Z}_{N-Q/2}^{N-1}} |\hat{h}_r^{(1)}(l)|^2}\right), \quad k \in \mathbb{Z}_1^{Q/2} \cup \mathbb{Z}_{N-Q/2}^{N-1}$$

where $\min(x_1, x_2)$ means selecting a smaller one between two values, $x_1$ and $x_2$;

α indicates the first smoothing factor;

$\hat{h}_r^{(1)}(k)$ is the first CFR estimation $\hat{h}_r^{(1)}$ on the subcarrier k;

$\hat{h}_r^{(1)}(l)$ is the first CFR estimation $\hat{h}_r^{(1)}$ on another of the subcarriers, subcarrier l;

$Z_{P_1}^{P_2}$ denotes a finite integer set $\{P_1, P_1+1, \ldots, P_2\}$; and

Q is the number of the subcarriers for actual tones.

10. The CFR estimation method according to claim 1, wherein the fourth CFR estimation $\hat{h}_r^{(4)}$ on one of the subcarriers, subcarrier k, $\hat{h}_r^4(k)$, is obtained as:

$\hat{h}_r^4(k) = \alpha_r(k-1)\hat{h}_r^{(3)}(k-1) + \alpha_r(k+1)\hat{h}_r^{(3)}(k+1) + (1-\alpha_r(k-1)-\alpha_r(k+1))\hat{h}_r^{(3)}(k) \ k \in Z_1^{Q/2} \cup Z_{N-Q/2}^{N-1}$, where $\hat{h}_r^{(3)}(k-1)$, $\hat{h}_r^{(3)}(k)$, and $\hat{h}_r^{(3)}(k+1)$ indicate the third CFR estimations $\hat{h}_r^{(3)}$ on subcarriers k−1, k, and k+1, respectively;

$\alpha_r(k-1)$, and $\alpha_r(k+1)$ are the second smoothing factors corresponding to the subcarriers k−1, and, k+1, respectively;

$Z_{P_1}^{P_2}$ denotes a finite integer set $\{P_1, P_1+1, \ldots, P_2\}$; and

Q is the number of the subcarriers for actual tones.

11. The CFR estimation method according to claim 1, wherein in the step of obtaining the CFR estimation $\hat{h}_r$ by averaging the CFR second and fourth estimations $\hat{h}_r^{(2)}$ and $\hat{h}_r^{(4)}$, the CFR estimation $\hat{h}_r$ is obtained as: $\hat{h}_r = (2\hat{h}_r^{(2)} + 4\hat{h}_r^{(4)})/6$.

\* \* \* \* \*